United States Patent [19]

Schwarz et al.

[11] Patent Number: 4,918,801
[45] Date of Patent: Apr. 24, 1990

[54] INSULATION SYSTEM METHOD FOR MULTITURN COILS OF HIGH VOLTAGE ELECTRICAL ROTATING MACHINES

[75] Inventors: Kurt K. Schwarz; Thomas D. Smith, both of Norwich, England

[73] Assignee: Laurence, Scott & Electromotors Ltd., Norwich, United Kingdom

[21] Appl. No.: 201,788

[22] Filed: Jun. 3, 1988

[30] Foreign Application Priority Data

Jun. 4, 1987 [GB] United Kingdom ............... 8713087

[51] Int. Cl.$^5$ ............................................ H02K 15/06
[52] U.S. Cl. ................................. 29/596; 264/272.2; 310/45
[58] Field of Search ................. 29/596; 428/448, 449; 310/45, 208, 215; 264/272.19, 272.2

[56] References Cited

U.S. PATENT DOCUMENTS 2,970,936  2/1961  Richardson .
4,399,191  8/1983  Iwabuchi et al. ............... 428/449 X
4,405,553  9/1983  Rothman et al. ................ 29/596 X
4,724,600  2/1988  Studniarz et al. .................... 29/596

FOREIGN PATENT DOCUMENTS 0088261   2/1983  European Pat. Off. .
2723634  11/1978  Fed. Rep. of Germany .
60-20761  2/1985  Japan .

OTHER PUBLICATIONS

"Neue Isolierung Steigert die Motoleistung" Asea--Zeitschrift, vol. 22, No. 5, p. 118.

Primary Examiner—Carl E. Hall
Attorney, Agent, or Firm—Lowe, Price, LeBlanc, Becker & Shur

[57] ABSTRACT

Insulation of multiturn high voltage stator windings is effected by applying interturn insulation in the form of glass-backed mica paper pre-treated with resin taken to a B-stage cure, at least to straight slot-engaging parts of the windings. The interturn insulation is mechanically consolidated and thermally cured and main insulation is then applied to the slot-engaging parts and end parts of the windings and consists of glass backed mica paper pre-treated with resin without a curing agent. The slot engaging parts are next mounted on the stator and the end parts of the windings are connected to them to form electrically completed windings which are then impregnated with a resin compound by a vacuum and pressure process followed by a thermal cure.

9 Claims, 1 Drawing Sheet

INSULATION SYSTEM METHOD FOR MULTITURN COILS OF HIGH VOLTAGE ELECTRICAL ROTATING MACHINES

BACKGROUND OF THE INVENTION

Multiturn coils of high voltage electrical rotating machines comprise a number of conductors insulated from each other, the "turn" insulation, and surrounded by further insulation, the "main" insulation, to earth. Each coil consists of straight portions, which are embedded in slots in the stator, and end windings connecting the straight portions together.

Both the turn and the main insulation are designed to provide long term endurance against continuous working voltage stress and also against transient over voltages imposed during service. In order to meet this requirement, the insulation consists of material highly resistant to electrical discharges, such as mica, thoroughly impregnated with a resinous compound. The impregnation operation is a highly critical feature of the manufacturing process, since this determines the degree to which the interstices within the insulation are filled with solid resin. Although mica is incorporated, the prospective voltage endurance and mechanical life of the coils is limited by the magnitude of electrical discharges within the voids inside the insulation. To verify the integrity of both turn and main insulation, of which impregnation is a major factor, it is desirable to carry out suitable non-destructive dielectric tests during manufacture of the windings.

In normal practice hitherto, the resin is introduced into the insulation by one of two methods, these are.

(a) "Resin rich"

Insulation in the form of tapes or wrappers is pre-tested with a B-stage resin, the combined materials being applied to the coils during their construction. The combination is then consolidated in a heated press, thus expelling voids and curing the resin component. The completed coils are subsequently mounted in the stator.

(b) Post impregnation, or vacuum and pressure impregnation (VPI). In this method the insulation is not fully saturated with resin during coil manufacture, but is sufficiently porous so that the larger part of the resin content can be introduced by a vacuum and pressure impregnation process after the coils are mounted in the stator.

The "resin rich" method has the advantage that the integrity of both turn and main insulation can be verified by non-destructive routine testing of individual coils prior to and after fitting in the stator before connecting the coils and before final processing. With post impregnation however, interturn testing at a level sufficient to verify full resin saturation is difficult, if not impossible, because fault indication is difficult to determine when all the coils are connected together, i.e. after the impregnation process is completed, and not practicable before final processing.

Nevertheless, the post impregnation method offers a significant advantage over the "resin rich" method in that the impregnation process ensures intimate contact of the main insulation to the slot sides, thus achieving mechanical rigidity and optimum thermal transfer. With the "resin rich" method, packing coils in the slots is time consuming and additional packing is needed to fix the coils in their slots. There is also no manufacturing stage test available to verify that a satisfactory degree of slot filling has been achieved.

SUMMARY OF THE INVENTION

The present invention consists in the method of insulating multiturn high voltage stator windings of electrical rotating machines, comprising applying interturn insulation in the form of glass-backed mica paper pre-treated with resin taken to a B-stage cure, at least to straight slot engaging parts of the windings prior to mounting thereof on the stator, mechanically consolidating and thermally curing said interturn insulation, applying main insulation to said slot-engaging parts and end parts of the windings in the form of glass backed mica paper pre-treated with resin without a curing agent, mounting said slot engaging parts of the windings on the stator, connecting end parts of the windings to said slot engaging parts thereof so as electrically to complete said windings and impregnating the electrically completed windings on the stator with a resin compound by a vacuum and pressure process followed by a thermal cure.

BRIEF DESCRIPTION OF THE DRAWINGS

The invention will now be described, by way of example, with reference to the accompanying drawings, in which.

DESCRIPTION OF THE PREFERRED EMBODIMENT

The conductors (a) are taped with glass-backed mica-paper tape, pre-treated with epoxy-novolac resin with $BF_3$ mono-ethylamine hardener, cured to the B-stage prior to taping. The resin content of the tape is sufficient to provide a significantly void-free insulation after the hot pressing operation, and is commonly in the order of 40%.

Figure 1:
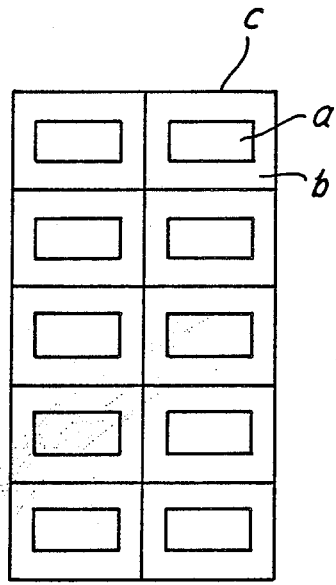
FIG. 1 is a cross-sectional view of a conductor stack provided with interturn insulation.

The taped conductors are formed into coils and the straight portions, which are later fitted into the stator slots, are subjected to heat and mechanical pressure, so that the B-stage resin melts and flows throughout the insulation structure. By sustaining the mechanical pressure, all significant voids are expelled from the insulation and the resin cured to a solid mass, (b). FIG. 1

A B-stage resin is a liquid resin/hardener mixture in which the degree of molecular cross-linking (cure) has proceeded only as far as a stage such that it is solid at room temperature. The material melts on heating and the cross-linking process continues until curing is complete. (The freshly blended mixture of materials exhibiting this characteristic has been termed A-stage, and the fully cross-linked material C-stage. However, only the term B-stage is in common use. The life of material in the B-stage can be prolonged by storing under cool dry conditions).

A routine surge voltage withstand test may be performed on the individual coils at this stage to verify the degree of resin fill between turns. This is carried out by applying either a high voltage impulse i.e. of wavefront in the order of 0.2 microsecond, or a sufficiently high frequency to develop the required voltage across the relatively low inductance of the coil.

Figure 2:
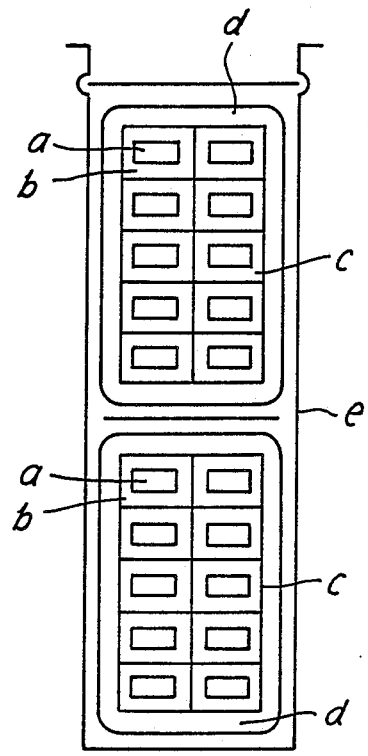
FIG. 2 is a cross-sectional view of conductor stacks of FIG. 1 with main insulation applied thereto and fitted into a stator slot.

The main insulation (d) is then applied to the consolidated conductor stack (c), FIG. 2, the material consisting of glass-backed mica-paper in tape or sheet form on the straight portions, and as tape on the end portions of the windings. The mica-paper is pre-treated with a bisphenol A epoxy without curing agent and of a molecular weight to achieve a flexible but not wet condition.

A thin layer of polyester felt or glass felt may be incorporated in the main insulation taping to assist resin penetration. The resin content of the combination is sufficiently low to permit full saturation during the post impregnation process.

The coils are inserted into the stator slots (e), the end windings suitably braced. i.e. mechanically located. and the coils connected together to form continuous windings. A further routine surge voltage withstand test may be performed on the individual coils before connecting together. This would be done to verify that there had been no damage to the turn insulation during mounting on the stator and bracing. Conventional high voltage surge testers apply a voltage to ground which may not be sustained safely by the unprocessed main insulation. However, by applying the test voltage with a centre-tapped surge generator, the test can be applied after applying the main insulation without major dielectric stress being applied to ground.

The wound and connected stator is then post-impregnated with a solvent free resin compound. This impregnant is a room temperature stable, low molecular weight adduct comprising cross-linking agents which are mainly anhydrides and a bisphenol A epoxy (N.B. the "A" here does not refer to A-stage resin materials). The wound stator is placed in a sealed pressure vessel. The process involves preheating the wound stator and subjecting it to a vacuum of typically less than 1° torr in order to drive off any volatiles remaining in the insulation. Whilst under vacuum the resin compound is introduced into the vessel covering the windings. The vacuum is released and a pressure of typically 6 atmospheres is applied to ensure that the compound fully penetrates throughout the main insulation, end winding and bracing ties. The compound, when introduced into the pre-treated sheets and tapes of the main insulation, is in stoichiometric proportions with the resin in the pre-treated insulating materials of the main insulation and rapidly cross-links during the heating process to form a solvent free solid mass. The type of resin and hardener is chosen to achieve the desired degree of penetration and rapidity of cure to reduce drain-out resulting in a substantially better degree of resin fill compared with many conventional types of VPI resins in common use.

The heating process is carried out in a suitable oven after removing the stator from the pressure vessel.

Routine voltage withstand and loss tangent dielectric tests may be performed to verify the degree of resin fill in the main insulation after completing the curing process. It will be appreciated that it is of vital importance to carry out significant non-destructive testing to ensure reliability. Whilst the conventional testing of main insulation is well established, the advantage gained by achieving an equivalent quality assurance level for turn insulating has to be realized by the early stage testing before final consolidation of the main insulation.

We claim:

1. A method of insulating sulliturn high voltage stator windings of electrical rotating machines, comprising the steps of applying interturn insulation in the form of glass-backed mica paper pre-treated with resin taken to a B-stage cure, at least to straight, slot engaging parts of the windings prior to mounting thereof on the stator, mechanically consolidating and thermally curing said interturn insulation, applying main insulation to said slot-engaging parts, said parts having consolidated and cured interturn insulation, and end parts of the windings in the form of glass backed mica paper pre-treated with resin without a curing agent, mounting said slot engaging parts of the windings on the stator, connecting end parts of the windings to said slot engaging parts thereof so as to electrically complete said windings and impregnating the electrically completed windings on the stator with a resin compound by a vacuum and pressure process followed by a thermal cure.

2. The method claimed in claim 1, which includes applying the interturn insulation in the form of glass-backed mica-paper pre-treated with bisphenol A epoxy novolac resin with $BF_3$ mono-ethylamine hardener cured to the B-stage.

3. The method claimed in claim 1, which includes applying the main insulation in the form of glass-backed mica-paper pre-treated with a bisphenol A epoxy resin without a curing agent and of a molecular weight to achieve a flexible substantially dry condition.

4. The method claimed in claim 1, wherein a layer of polyester or glass felt is used with the main insulation to assist penetration of the impregnating resin compound.

5. The method claimed in claim 1 wherein the impregnating resin compound employed for impregnating the windings after mounting thereof on the stator is a room temperature stable low molecular weight adduct comprising cross-linking agents which are mainly anhydrides together with a bisphenol A epoxy resin.

6. The method claimed in claim 1, wherein the impregnating resin compound employed for impregnating the windings after mounting thereof on the stator is introduced into the pre-treated main insulation in stoichiometric proportions with the resin in the pre-treated main insulation.

7. A method of insulating multiturn high voltage stator windings of electrical rotating machines, comprising the steps of applying interturn insulation in the form of glass-backed mica paper pre-treated with resin taken to a B-stage cure, at least to straight, slot engaging parts of the windings prior to mounting thereof on the stator, mechanically consolidating and thermally curing said interturn insulation, applying an impulse or high voltage high frequency test to the windings, applying main insulation to said slot-engaging parts, said parts having consolidated and cured interturn insulation, and end parts of the windings in the form of glass-backed mica paper pre-treated with resin without a curing agent, mounting said slot engaging parts of the windings on the stator, connecting end parts of the windings to said slot engaging parts thereof so as to electrically complete said windings and, subsequent to the testing, impregnating the electrically completed windings on the stator with a resin compound by a vacuum and pressure process followed by a thermal cure.

8. A method of insulating multiturn high voltage stator windings of electrical rotating machines, comprising the steps of applying interturn insulation in the form of glass-backed mica paper pre-treated with resin taken to a B-stage cure, at least to straight, slot engaging parts of the windings prior to mounting thereof on the stator, mechanically consolidating and thermally curing said interturn insulation, applying main insulation to said slot-engaging parts, said parts having consolidated and cured interturn insulation, and end parts of the windings in the form of glass-backed mica pre-treated with resin without a curing agent, mounting said slot engaging parts of the windings on the stator, applying an impulse or high voltage high frequency test to the windings before or after mounting thereof on the stator, connecting end parts of the windings to said slot engaging parts thereof so as to electrically complete said windings and impregenating the electrically completed windings on the stator with a resin compound by a vacuum and pressure process followed by a thermal cure.

9. The method claimed in claim 8, wherein the high voltage test is applied without excessively stressing the main insulation by means of a centre tapped or equivalent "unearthed" test arrangement.

* * * * *